United States Patent

Kaneko et al.

Patent Number: 5,140,447
Date of Patent: Aug. 18, 1992

[54] DISPLAY MEDIUM HAVING A COLORED POLYMER LIQUID CRYSTAL LAYER

[75] Inventors: Shuzo Kaneko, Yokohama; Kazuo Isaka, Tokyo; Akihiro Mouri, Kokubunji; Kazuo Yoshinaga; Toshikazu Ohnishi, both of Tokyo; Yutaka Kurabayashi, Yokohama; Takeo Eguchi, Atsugi; Yomishi Toshida, Yokohama, all of Japan

[73] Assignee: Canon Kabushiki Kaisha, Tokyo, Japan

[21] Appl. No.: 746,182

[22] Filed: Aug. 15, 1991

Related U.S. Application Data

[63] Continuation of Ser. No. 287,152, Dec. 21, 1988, abandoned.

[30] Foreign Application Priority Data

Dec. 22, 1987 [JP] Japan .................. 62-322687
Dec. 19, 1988 [JP] Japan .................. 63-318610

[51] Int. Cl.$^5$ .................................. G02F 1/13
[52] U.S. Cl. ........................... 359/43; 359/96; 359/99
[58] Field of Search ............ 350/350 R, 351, 331 R, 350/331 T, 334, 349, 339 R, 317, 357; 359/43, 44, 45, 96, 99; 430/20, 203, 204; 346/76 R, 76 PH

[56] References Cited

U.S. PATENT DOCUMENTS

| | | | |
|---|---|---|---|
| 3,697,297 | 10/1972 | Churchill et al. | 350/351 |
| 3,951,133 | 4/1976 | Reese | 350/351 |
| 4,749,260 | 6/1988 | Yang et al. | 350/357 |
| 4,781,444 | 11/1988 | Suginoya et al. | 350/317 |
| 4,786,148 | 11/1988 | Sekimura et al. | 350/339 F |
| 4,796,980 | 1/1989 | Kaneko et al. | 350/350 S |
| 4,965,591 | 10/1990 | Kurabayashi et al. | 346/108 |
| 5,059,000 | 10/1991 | Kaneko et al. | 359/68 X |

FOREIGN PATENT DOCUMENTS

| | | | |
|---|---|---|---|
| 0200226 | 10/1985 | Japan | 350/351 |
| 0166520 | 7/1986 | Japan | 350/351 |

OTHER PUBLICATIONS

Samulski, "Polymeric liquid crystals" Physics Today, May 1982.

Primary Examiner—Stanley D. Miller
Assistant Examiner—Huy K. Mai
Attorney, Agent, or Firm—Fitzpatrick, Cella, Harper & Scinto

[57] ABSTRACT

A color display medium is constituted by a colored polymer layer having at least two display regions of different colors, typically three colors of blue, green and red, along the extension of the polymer layer. The display regions of different colors have respectively different wavelength regions of light absorption or respectively different temperatures of thermal transition between transparent and scattering states.

26 Claims, 6 Drawing Sheets

PRE-IMAGE

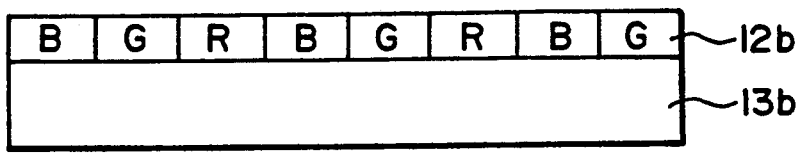
F I G. 2
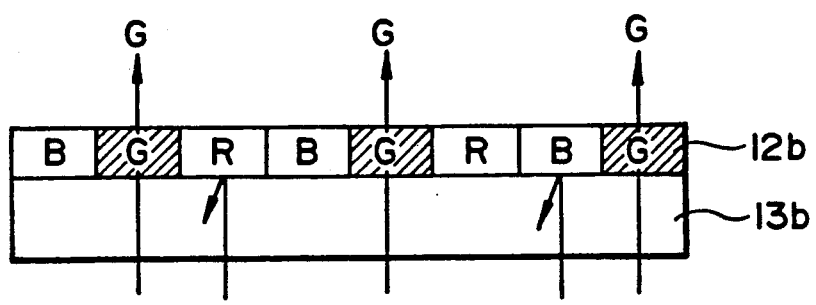
F I G. 3

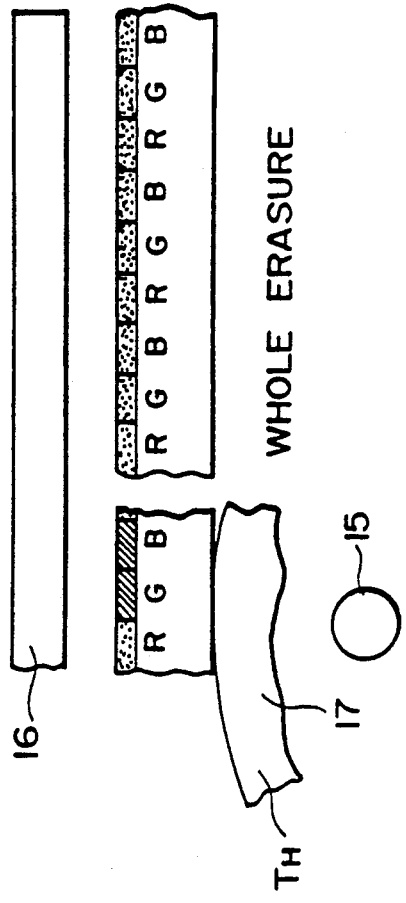
FIG. 6A
FIG. 6B
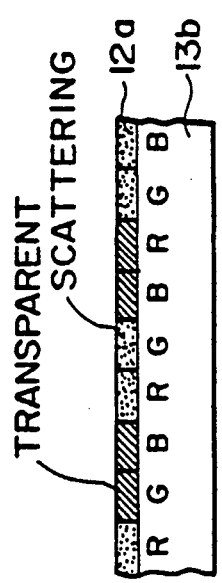
FIG. 6C
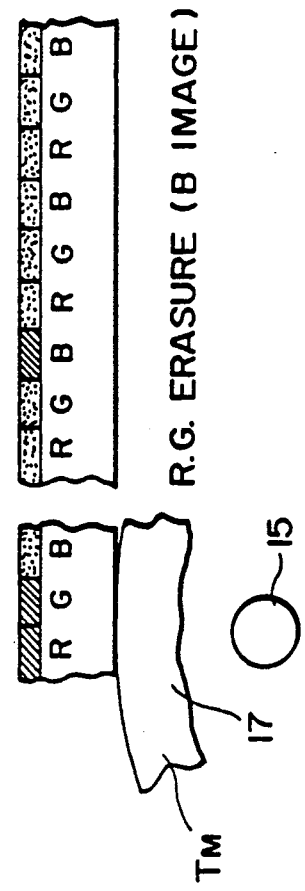
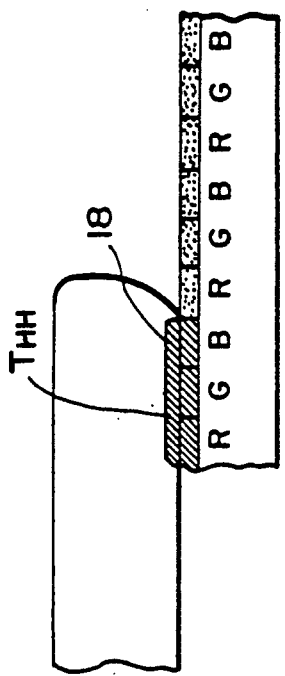
FIG. 6D

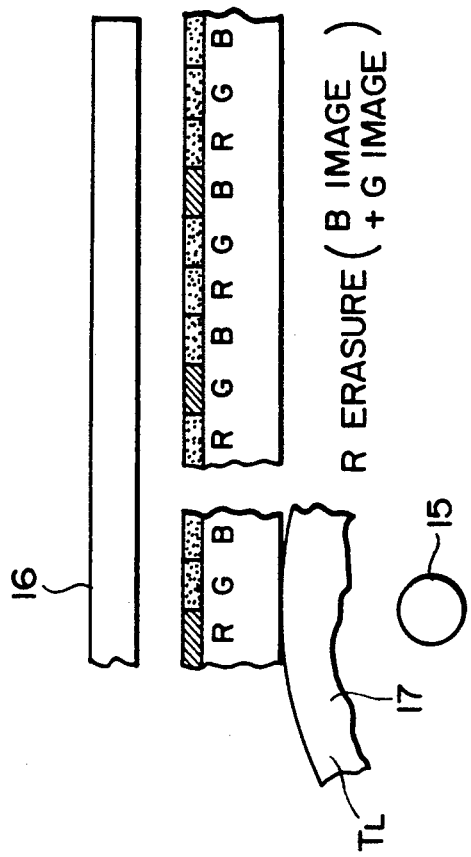
FIG. 6F
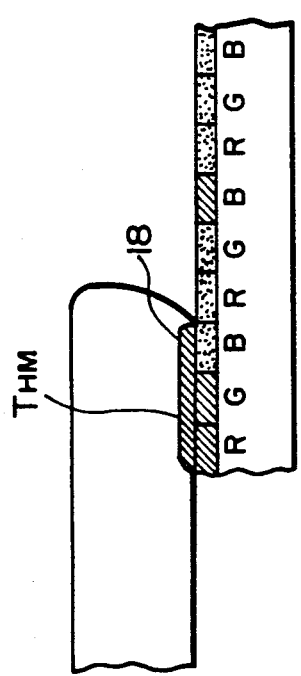
FIG. 6E
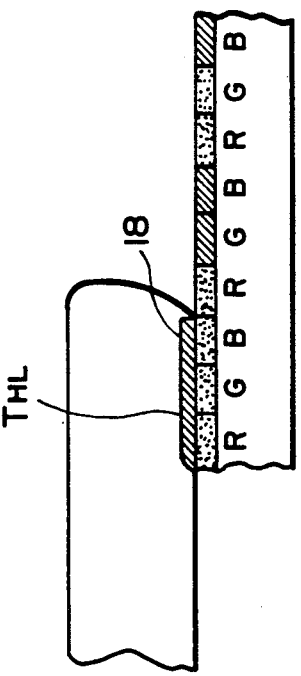
FIG. 6H
FIG. 6G

DISPLAY MEDIUM HAVING A COLORED POLYMER LIQUID CRYSTAL LAYER

This application is a continuation of application Ser. No. 287,152, filed Dec. 21, 1988, now abandoned.

FIELD OF THE INVENTION AND RELATED ART

The present invention relates to a color display medium, particularly a color display medium comprising a polymer layer.

Hitherto, motion picture outputs of a television receiver or a VTR (video tape recorder) or outputs through conversational operation with a computer have been displayed on a display monitor such as a CRT (cathode ray tube) or a TN (twisted nematic)-type liquid crystal panel, while fine images such as characters or figures outputted from a word processor or a facsimile machine have been printed out on paper to provide a hard copy.

A CRT provides a beautiful image for a motion picture output but causes a degradation in observability due to flickering or scanning fringes because of insufficient resolution.

Further, a conventional liquid crystal display using a TN-liquid crystal as described above provides a thin apparatus but involves problems, such as troublesome steps including a step of sandwiching a liquid crystal between glass substrates and a darkness of a picture.

Further, the CRT and TN-liquid crystal panel do not have a stable image memory characteristic, so that it is necessary to always effect beam scanning or application of pixel voltages even for output of still images as described above.

On the other hand, a hard copy image outputted on paper can be obtained as a stable memory image, but frequent use thereof is accompanied with the necessity of a large space for filing, and the loss of resources caused by a large amount of disposal cannot be ignored. Further, such a hard copy-making process has involved handling of ink or toner, treatment such as development and fixation, maintenance operation, and supply of materials for consumption.

SUMMARY OF THE INVENTION

A principal object of the present invention is to provide a display medium capable of displaying highly fine color images with a clarity comparable to that has been obtained only by a hard copy and also capable of writing and erasing color images.

According to a generic aspect of the present invention, there is provided a display medium, comprising a colored polymer layer having at least two display regions of different colors along the extension of the polymer layer, the display regions of different colors having different conditions for transition between transparent and scattering states.

According to a more specific aspect of the present invention, there is provided a display medium comprising a colored polymer layer having at least two display regions of different colors along the extension of the polymer layer, the display regions of different colors having respectively different wavelength regions of light absorption.

According to another specific aspect of the present invention, there is provided a display medium comprising a colored polymer layer having at least two display regions of different colors along the extension of the polymer layer, the display regions of different colors having different temperatures of thermal transition between transparent and scattering states.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 2 to 5 are schematic sectional views each illustrating a structure of a display medium according to the present invention;

FIGS. 6A-6H are schematic sectional views showing a series of operations for forming a color image by using a display medium according to the present invention.

DESCRIPTION OF THE PREFERRED EMBODIMENTS

Figure 1:
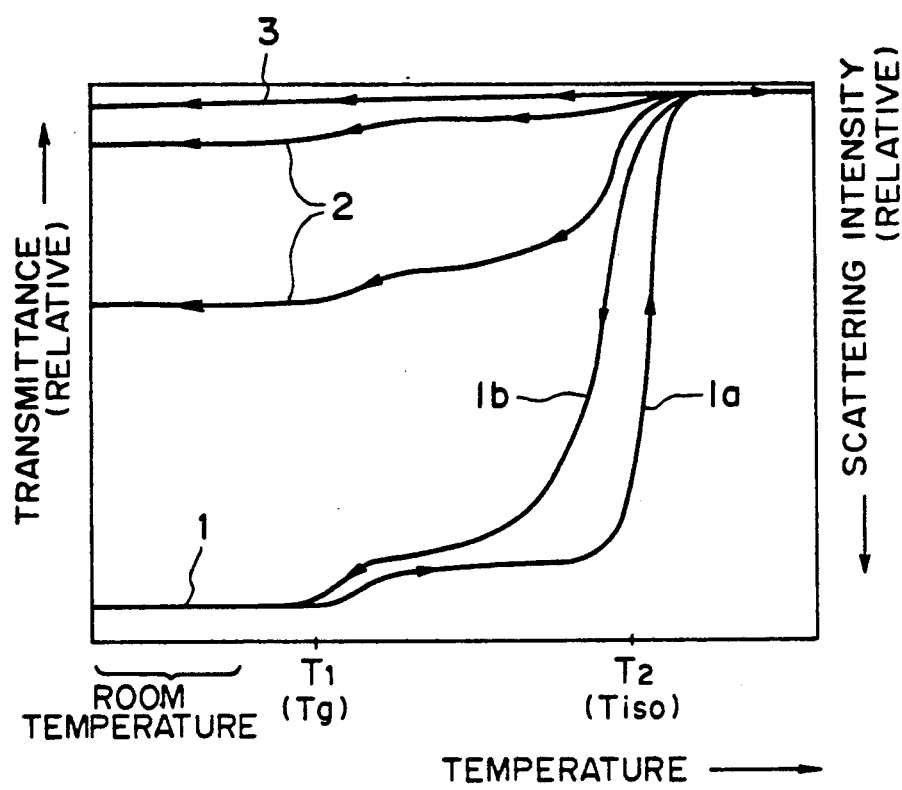
FIG. 1 is a diagram showing a relationship between the temperature and transmittance (scattering intensity)

The image forming medium of the present invention may suitably comprise a polymer, particularly a thermotropic polymer liquid crystal. Examples thereof may include a side chain-type polymer liquid crystal which comprises a main chain of a methacrylic acid polymer, a siloxane polymer, etc., and a mesogen or low-molecular weight liquid crystal unit in side chains thereof like pendants; and also a main chain-type polymer liquid crystal comprising a mesogen unit in its main chain, such as those of the polyester-type or polyamide-type, as used in the field of high-strength and high-modulus, heat-resistant fiber or resin.

These polymer liquid crystals may assume a smectic phase, nematic phase, cholesteric phase or another phase or can also be a discotic liquid crystal.

Another class of polymer liquid crystals suitably used in the present invention may include a polymer liquid crystal showing ferroelectricity by introducing an asymmetric carbon atom to assume SmC* (chiral smectic C) phase.

Specific examples of the polymer liquid crystal used in the present invention are enumerated hereinbelow while other polymer liquid crystals can also be used in the present invention.

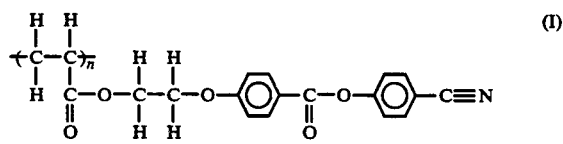

$\overline{M}w = 18,000$

Glass $\xrightarrow{75° C.}$ Liquid crystal phase (N) $\xrightarrow{110° C.}$ Iso.

N: nematic phase

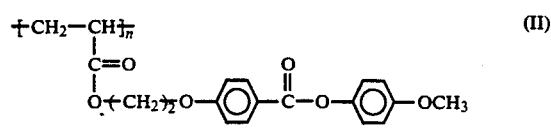

Glass $\xrightarrow{47°\text{C}}$ Liquid crystal phase (N) $\xrightarrow{77°\text{C}}$ Iso.

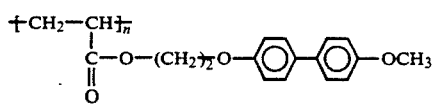
(III)

Glass $\xrightarrow{120°\text{C}}$ Liquid crystal phase (N) $\xrightarrow{152°\text{C}}$ Iso.

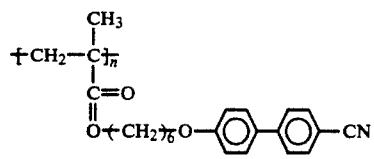
(IV)

Glass $\xrightarrow{50°\text{C}}$ Liquid crystal phase (Sm) $\xrightarrow{100°\text{C}}$ Iso.

Sm: smectic phase

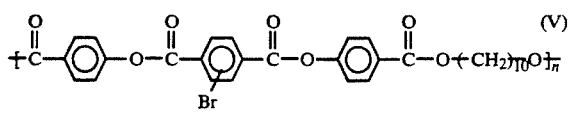
(V)

Glass $\xrightarrow{140°\text{C}}$ Liquid crystal phase (Sm) $\xrightarrow{196°\text{C}}$ Iso.

The above polymer liquid crystals may be used singly or in combination of two or more species.

In order to form a layer, a polymer liquid crystal may be dissolved in a solvent to form a solution for application. Examples of the solvent used for this purpose may include: dichloroethane, dimethylformamide (DMF), cyclohexane, tetrahydrofuran (THF), acetone, ethanol, and other polar or non-polar solvents, and mixtures of these. Needless to say, these solvents may be selected based on consideration of such factors as dissolving power of the polymer liquid crystal used, and the material of or wettability of the substrate or surface layer formed thereon to be coated thereby.

An embodiment of the image forming medium of the present invention and a function thereof will now be explained based on a specific example wherein a polymer liquid crystal of the above formula (I) was used.

The above polymer liquid crystal was dissolved in dichloroethane at a concentration of 20 wt. % and the solution was applied by an applicator on a polyester transparent substrate washed with alcohol, followed by standing at 95° C. for 10 minutes to form a white scattering film in a thickness of 10 microns or slightly thicker.

The thus obtained white sheet was scanned in a pattern of characters or figures by a thermal head, whereby a white pattern corresponding to the scanned pattern was fixed. When the sheet was placed on a backing member having an optical density of 1.2, a clear black display was obtained against the white background.

Further, when the above sheet was placed on an ordinary overhead projector, a clear negative image including a character or pattern image projected in white was obtained.

Then, the whole area of the above sheet having the above-mentioned pattern was heated to about 120° C. and then heated at about 90° C. for several seconds, whereby the original white scattering state was restored on the whole area and stably retained even if cooled to room temperature as it was, so that additional recording and display were possible.

The above series of phenomena can be controlled based on the fact that the above-mentioned polymer liquid crystal can assume at least three states including a film state below the glass transition point where it retains a stable memory state, a liquid crystal state where it can be transformed into a substantially optical scattering state and an isotropic film state at a higher temperature where it assumes an isotropic molecular alignment.

Now, the principle process of image formation by using a polymer liquid crystal layer formed on a transparent substrate is explained with reference to FIG. 1, which shows changes in reflectance or scattering intensity of a polymer liquid crystal layer versus temperature.

Referring to FIG. 1, the above-mentioned scattering state corresponds to a state ①. When the polymer liquid crystal layer in the state ① is heated by a heating means, such as a thermal head or laser light, to a temperature above $T_2$ (Tiso=isotropic state transition temperature) along a path denoted by ⓐ and then rapidly cooled, a light-transmissive state as shown by ③ similar to the isotropic state is fixed. Herein, "rapid cooling" means cooling at a rate sufficiently large as to fix the state before the cooling without substantial growth of an intermediate state, such as a lower-temperature liquid crystal phase. Such a rapid cooling condition can be realized without a particular cooling means and by having the recording medium stand in air for natural cooling. The thus-fixed isotropic state is stable at a temperature below $T_1$ (Tg: glass transition point), such as room temperature or natural temperature, and is stably used as an image memory.

On the other hand, if the polymer liquid crystal layer heated to above $T_2$ is held at a liquid crystal temperature between $T_1$ and $T_2$ for a period of, e.g., 1 second to several seconds, the polymer liquid crystal layer increases the scattering intensity during the holding period as indicated by a curve ⓑ to be restored to the original scattering state ① at room temperature. The resultant state is stably retained at a temperature below $T_1$.

Further, if the polymer liquid crystal layer is cooled while taking a liquid crystal temperature between $T_1$-$T_2$ for a period of, e.g., about 10 milliseconds to 1 second as indicated by curves ②, an intermediate transmissive state is obtained at room temperature, thus providing a gradation.

Thus, in this embodiment, the resultant transmittance or scattering intensity may be controlled by controlling the holding period at a liquid crystal temperature after heating into an isotropic state and until cooling to room temperature. The resultant state may be stably retained below $T_1$. Further, the velocity of restoring to the original scattering state is larger at a temperature closer to $T_2$ in the liquid crystal temperature range. If the medium is held at a temperature within the liquid crystal temperature range for a relatively long period, the scattering state ① can be restored without heating once into isotropic phase or regardless of the previous state.

In the image forming process according to the present invention, a more beautiful image can be obtained by adding a factor for intensifying the above-mentioned scattering state. For this purpose, it is preferred that a stabler optical scattering film has been formed by holding the polymer liquid crystal at a liquid crystal temperature (75° C.-110° C.)in the stage of evaporation of a solvent, such as dichloroethane, DMF (dimethylformamide) or cyclohexane after it is dissolved in the solvent and applied on a substrate or after the evaporation. An optimum condition for such a film formation is that the polymer liquid crystal is added to a solvent in such a proportion that a clear or viscous solution thereof is formed after the addition and stirring. For example, when the polymer liquid crystal of the above formula is singly dissolved in dichloroethane, it forms a white turbid micelle state at a concentration of 10 wt. %, but stably forms a transparent viscous solution at a relatively high concentration on the order of 15–25 wt. %. This tendency is observed also for other types of polymer liquid crystals and combinations with another solvent. If such a transparent viscous solution is applied by means of an applicator, a wire bar, dipping, etc., onto a well washed substrate, such as glass or polyester and then held at the above-mentioned liquid crystal temperature, an optical scattering film having a higher uniformity can be obtained than in a case where a solution in the micelle state is similarly applied for film formation.

In this instance, the surface of the substrate is carefully cleaned without orientation or with wiping into plural directions with ethyl alcohol, etc.

The solvent for the polymer liquid crystal can be a mixture of plural solvents. Further, it is also possible to add an additive such as a colorant to the polymer liquid crystal within an extent not adversely affecting the coating.

FIG. 2 is a schematic sectional view showing a laminar structure of a display medium according to the invention.

According to this embodiment, the display medium comprises a transparent substrate 13b of glass, polyester, etc., coated with a polymer liquid crystal layer 12b containing dichroic or non-axial dyes showing an optical absorption at least in the visible range, such as those in colors of blue (B), green (G) and red (R) by means of a printing process such as dot printing or a coating process in a color pattern of color mosaic or stripes.

A various desired color may be obtained by adding a small amount of various colorants inclusive of yellow (e.g., "LSY-116", available from Mitsubishi Kasei Kogyo K.K.), magenta (e.g., "LSR-401", ditto), cyan (e.g., "LSB-335", ditto), green (e.g., a mixture of the above "LSY-116" and "LSB-335"), or red (e.g., "LSR-405", ditto, or a mixture of the above "LSR-401" and "LSY-116"). The thickness of the polymer liquid crystal layer providing a color with mixing of such a colorant may preferably be 0.5 micron or above, particularly 2–15 microns.

In order for the above-formed color polymer liquid crystal layer 12b to show a strong optical scattering characteristic at its liquid crystal temperature, the above-mentioned colorant may be contained in a proportion of 10 wt. % or below, preferably 5 wt. % or below, further preferably 4 wt. % or below, of the polymer liquid crystal. It is preferred that the colorant may be contained in a proportion of 1 wt. % or above of the polymer liquid crystal. Further, it is preferred that the colorant is dissolved at a concentration of 1 wt. % or above in a solvent together with the polymer liquid crystal, when the polymer liquid crystal is contained in a relatively high concentration, e.g., around 20 wt. % of the solvent.

In an example according to this embodiment a thermal head comprising 12 dots per mm may be used to heat scan a sheet of the display medium which contains 4 lines each of B, G and R per mm providing a total of 12 lines per 1 mm, whereby the polymer liquid crystal corresponding to the G portion is converted from its scattering state to a filter-like optically transmission state showing a green color as shown in FIG. 3.

Then, if the thus treated sheet of the display medium is set on an ordinary overhead projector or a slide projector to be projected onto a screen by transmission (FIG. 3) or reflection, a green light image is projected corresponding to the heat-scanned portion while leaving the surrounding portion dark. On the other hand, if portions corresponding to all of B, G and R of the polymer liquid crystal are heat-scanned, the portions are changed into filter-like optically transparent states showing the respective colors. The projection of the thus-treated display medium provides an almost white projected image.

In this embodiment, the image to be projected is basically a high contrast negative image and can provide combinations of various colors. As a result, it is possible in principle to form a full color image by controlling the pulse duration, etc., of applied voltages to the thermal head.

Further, the image thus formed may be well recognized by direct observation by providing a backlight of a fluorescent lamp, an EL (electroluminescence) panel, etc., behind the display medium.

Further, in addition to the above-mentioned mixing of a colorant dye and a polymer liquid crystal in a solvent, it is also possible to form a color polymer liquid crystal as described above by copolymerization of a colorant monomer and a liquid crystal monomer or by forming a color pattern in mosaic or stripes of a colorant on a substrate followed by application of a liquid crystal monomer to cause copolymerization.

Figure 4:
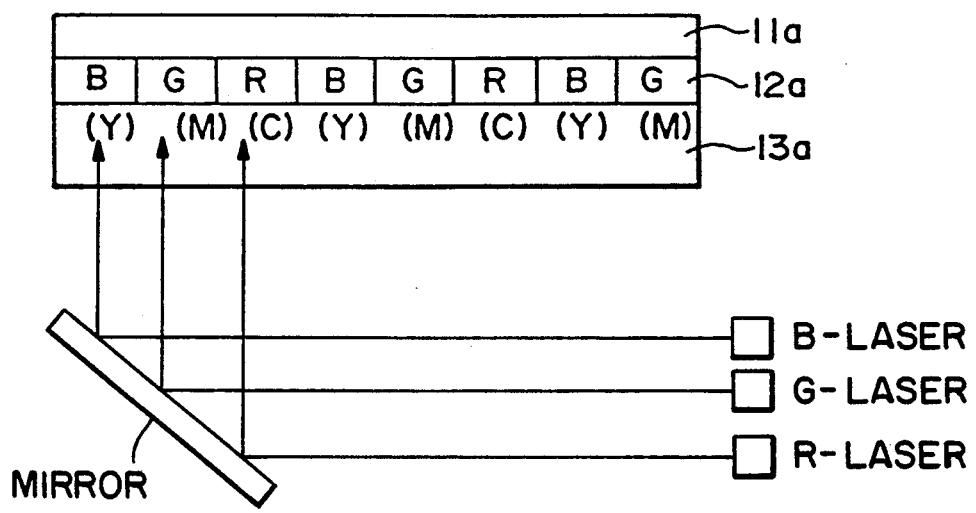

FIG. 4 shows another embodiment of the display medium according to the present invention. Referring to FIG. 4, the display medium comprises, on a substrate 13a, a color polymer liquid crystal layer 12a of blue, green and red, or yellow, magenta and cyan formed in a light scattering state, and further thereon a white scattering polymer liquid crystal layer assuming a white scattering state at a liquid crystal temperature. It is possible to insert an intermediate transparent layer of epoxy resin, etc., as desired. The white scattering polymer liquid crystal layer may preferably have a thickness of 1 micron or above, particularly 2–15 microns, so as to provide a sufficient effect of optically hiding the pattern of the lower color polymer liquid crystal layer 12a, whereby the entire face may be recognized as white when viewed from above.

The principle of color formation by using the embodiment of the display medium will be explained hereinbelow.

Figure 5:
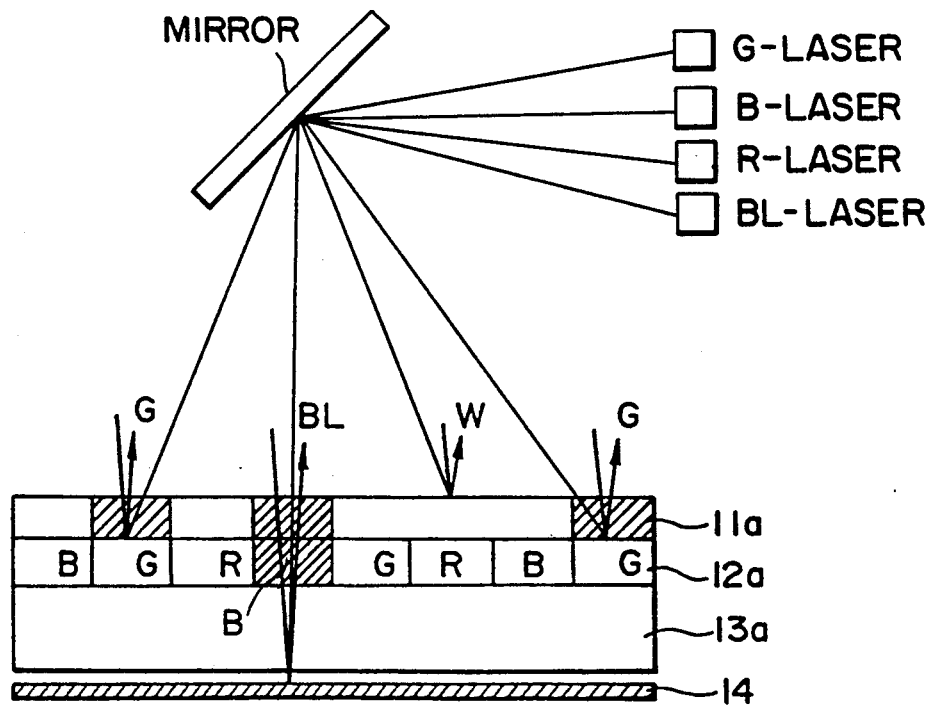

In this embodiment, as shown at a color pattern G in FIG. 5, when only the upper polymer liquid crystal layer 11a is fixed in an isotropic transparent state, the color of the lower color polymer liquid crystal layer 12a is recognized. Further, as shown at a color pattern B in FIG. 5, when both the upper and lower polymer liquid crystal layers 11a and 12a are fixed in an isotropic transparent state, the color of the substrate 13a is recognized, or if the substrate 13a is transparent and a black backing member 14 is placed behind the substrate 13a (as shown in FIG. 5), the black color of the backing member 14 is recognized. As the polymer liquid crystal 12a assumes a filter-like transparent state of a respective color in its isotropic state, the above-mentioned black color or a dark color of low saturation is preferred so as to be recognized while being little affected by the respective colors of the polymer liquid crystal layer 12a.

In this embodiment, the clarification (conversion into a transparent state) of the upper white scattering polymer liquid crystal layer 11 and the clarification (conversion into a filter-like transparent state) of the lower color polymer liquid crystal layer are separately performed by heat scanning with control of the heat quantity. In order to effectively realize this operation, the upper white scattering polymer liquid crystal layer 11a may preferably comprise a polymer liquid crystal having a transition temperature $I_2$ (Tiso) as described above which is higher than that of a polymer liquid crystal of the lower color polymer liquid crystal layer 12a.

According to a preferred example of the combination satisfying the above condition when selected from the above-mentioned polymer liquid crystals, the upper layer 11a comprise

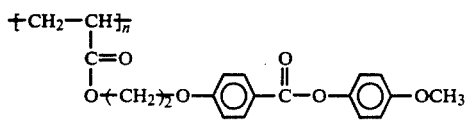

(II)

Glass $\xrightarrow{47°\text{C.}}$ Liquid crystal phase (N) $\xrightarrow{77°\text{C.}}$ Iso.

and the lower layer 12a may comprise

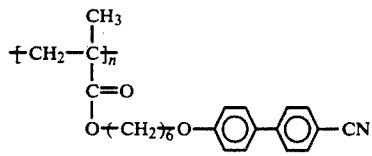

(IV)

Glass $\xrightarrow{50°\text{C.}}$ Liquid crystal phase (Sm) $\xrightarrow{100°\text{C.}}$ Iso.

By using this combination similarly as in the above embodiment, a thermal head is driven at a relatively low voltage to heat-scan portions corresponding to G of the color polymer liquid crystal layer 12a, whereby only the heat scanned portions of the upper scattering polymer liquid crystal layer are fixed into a transparent state and the green color of the color polymer liquid crystal layer 12a is observed therethrough as shown in FIG. 5.

Further, also as shown in FIG. 5, when the thermal head is driven at a relatively high voltage to heat-scan portions corresponding to G of the lower layer 12a, the portions are fixed into transparency down to the blue portions of the lower layer 12a, where the black color of the backing member 14 can be observed.

On the other hand, non-heated portions remain in white, so that a color image may be formed in a white background which is clear similarly as a color image formed on ordinary paper. In this instance, if the display medium is illuminated with an appropriate white light from above, a clearer image can be observed. It would be apparent that various modifications are possible within the scope of the present invention.

Hereinbelow, the present invention will be explained more specifically with reference to examples. It is to be understood however that the present invention is not limited thereto.

EXAMPLE 1

A display medium is constituted to have a laminar structure as shown in FIG. 4, wherein the substrate 13a is made transparent so that the color polymer liquid crystal layer can be irradiated with a laser beam through the substrate 13a.

The B pattern of the lower color polymer liquid crystal layer contains a laser-absorbing dye (e.g., "IR-750" available from Nippon Kayaku K.K.) having an absorption peak wavelength around 750 nm, the G pattern contains a laser-absorbing dye (e.g., "IR-820", ditto) having an absorption peak wavelength around 820 nm, and the R pattern contains a laser-absorbing dye (e.g., "CY-9", ditto) having an absorption peak around 780 nm may be applied together with a solvent on the substrate 13a by thin layer coating, printing, etc., or may be formed by addition in a small amount into the polymer liquid crystal layer 12a.

In combination with the above-prepared display medium, lasers for B, G and R having luminous center wavelengths of around 750 nm, 850 nm and 780 nm, respectively, are used for scanning with modulation for respective selection of B, G and R, so that corresponding portions of the polymer liquid crystal layers 11a and 12a are heated. As a result, the irradiated portions of only the upper white scattering polymer liquid crystal layer 11a are made transparent by relatively weak irradiation, and the irradiated portions of both the upper and lower layers 11a and 12a are made transparent by relatively strong irradiation.

According to this mode, the latitude of fine registration by laser irradiation for respectively colors may be enlarged.

Alternatively, it is also possible to use a separate laser of a relatively high output for clarifying both the upper and lower layers 11a and 12a, e.g., for providing a black color as shown in FIG. 5. In this case, the laser may be selected to emit a laser beam to which all the patterns B, G and R of the color polymer liquid crystal layer 12a show a sensitivity.

A similar image formation may be effected by using a structure shown in FIG. 2.

In this embodiment, if each laser-absorbing dye is not sensitive to the lasers for irradiating the other colors, the above-color pattern may be in a mosaic pattern.

The thus-formed image in the above example may be erased by holding the display medium at a prescribed temperature, i.e., a temperature providing the liquid crystal phase of the polymer liquid crystal used, for a prescribed period, so that the display medium may be respectively used. In this instance, a higher speed of uniform erasure can be effected by once heating the polymer liquid crystal layer into an isotropic phase and then holding the polymer liquid crystal layer at a relatively higher temperature in the liquid crystal temperature range.

The above-mentioned polymer liquid crystals have sufficient heat resistance and film strength so that they can essentially be used for image formation as they are but can be coated with a protective layer, as desired, of polyimide, polyamide, etc., in order to further increase the strengths.

EXAMPLE 2

Another embodiment is explained with reference to FIG. 2.

In this embodiment, the display medium comprises a transparent substrate 13b of glass, polyester, etc., coated with a polymer liquid crystal layer 12b comprising dichroic or non-axial dyes such as those in colors of blue (B), green (G) and red (R) respectively mixed into polymer liquid crystals having different temperatures for transition between scattering and transparent states by means of printing such as dot printing or coating in a regular or random color pattern of mosaic or stripes.

More specifically, a colored polymer liquid crystal layer may be formed in the following manner.

Polymer liquid crystals corresponding to R, G and B by containing small amounts of respective colors of dyes respectively in a solid state are separately pulverized below their glass transition temperatures. The resultant particles are classified into a range of 50 microns ±25 microns. The colored particles of polymer liquid crystals of respective colors are mixed together and applied in a single dispersed layer on a substrate by means of an electrostatic coater.

Then, the whole layer of the polymer liquid crystal particles is heated to a temperature above the highest one of the solid-liquid crystal transition temperatures ($T_{CL}$) of the polymer liquid crystals colored in three colors to be sintered into a film.

An example of the combination of the polymer liquid crystals having different transition temperatures and dyes is shown in the following Table 1.

TABLE 1

| Polymer liquid crystal | | | |
|---|---|---|---|
| Formula | Phase transition series | Dye | |
| (II) | Glass $\xrightarrow{47° C.}$ LC phase (N) $\xrightarrow{77° C.}$ Iso. | LSR-405 (1%) | R |
| (I) | Glass $\xrightarrow{75° C.}$ LC phase (N) $\xrightarrow{110° C.}$ Iso. | LSY-116 (0.5%) + LSB-335 (0.5%) | G |
| (III) | Glass $\xrightarrow{120° C.}$ LC phase (N) $\xrightarrow{152° C.}$ Iso. | LSB-335 (0.5%) + LSR-401 (0.5%) | B |

*LSR-405: Red dye available from Mitsubishi Kasei K.K.
LSY-116: Yellow dye available from Mitsubishi Kasei K.K.
LSB-335: Cyan dye available from Mitsubishi Kasei K.K.
LSR-401: Magenta dye available from Mitsubishi Kasei K.K.

Thus, as shown in FIG. 6A, there is formed a display medium having a polymer liquid crystal layer 12b including a red (R) pattern comprising the polymer liquid crystal (II) and LSR-405, a green (G) pattern comprising the polymer liquid crystal (I) and LSY-116 +LBS-335, and a blue (B) pattern comprising the polymer liquid crystal (III) and LSB-335+LSR-401. An image forming process using the above display medium is explained hereinbelow with reference to FIGS. 6A–6H. In the process, an apparatus including a halogen lamp 15, a warming member for gradual cooling 16, a contact member for heat application 17 and a thermal head 18 is used.

(a) Explanation is started from a state wherein a preimage as shown in FIG. 6A including a transparent pattern indicated by hatching and a scattering pattern indicated by sand has been formed in advance.

(b) As shown in FIG. 6B, the whole area of the polymer liquid crystal layer 12a is heated to an erasure temperature $T_H$ (>152° C.) to heat the whole region into an isotropic phase by contact with the substrate 13b of a contact member 17 of aluminum, etc., heated by a halogen lamp 15. Then, the polymer liquid crystal layer is gradually cooled while using a warming member 16 of a planar heater to maintain a constant temperature. As a result, the entire area of the polymer liquid crystal layer is erased into a scattering state.

(c) As shown in FIG. 6C, a thermal heat 18 is energized by application of a controlled voltage (or current) depending on a B (blue) signal so as to instantaneously heat-scan the polymer liquid crystal layer to a writing temperature $T_{HH}$ (>152° C.). As a result, all the color pixels of R, G and B comprising the polymer liquid crystals (II), (I) and (III), respectively, in the heated portions are clarified.

(d) Then, as shown in FIG. 6D, the entire area is heated to an erasure temperature $T_M$ (100° C.<$T_M$<about 130° C. (=120° C. (Tg (III))+about 10° C.)), followed by gradual cooling to erase the R and G pixels into a scattering state and selectively leave a B image.

(e) Then, as shown in FIG. 6E, the thermal head 18 is energized under control depending on a G (green) signal so as to instantaneously heat-scan the polymer liquid crystal layer to a writing temperature $T_{HM}$ (77° C.<$T_{HL}$<about 95° C. (=75° C. (Tg (I))+about 20° C.)). As a result, the color pixels of R and G comprising the polymer liquid crystals (II) and (I) in the heated portions are clarified. At this time, the B image obtained above is not affected by heating to the temperature $T_{HM}$ to be kept in a display state.

(f) Then, as shown in FIG. 6F, the entire area is heated to an erasure temperature $T_L$ (77° C.<$T_L$<about 85° C. (=75° C. (Tg (I))+about 10° C.)), followed by gradual cooling to erase the R pixels into a scattering state and selectively leave a G image in addition to the already formed B image.

(g) Then, as shown in FIG. 6G, the thermal head is energized under control depending on a R (red) signal so as to instantaneously heat-scan the polymer liquid crystal layer to a writing temperature $T_{HL}$ (77° C.<$T_{HL}$<about 95° C. (=75° C. (Tg (I))+about 20° C.)). As a result, the color pixels of R comprising a polymer liquid crystal (II) in the heated portions are clarified to form a full color image as shown in FIG. 6H.

The whole erasure step (b) among the above mentioned steps (b)–(g) may be conducted when the image formation is repeated.

Further, the above operation steps (b)–(g) can be effected independently or in appropriate combination. For example, in order to display B and G images simultaneously, the steps (b), (c) and (f) are performed. Further, the steps (b), (e) and (f) may be performed in order to display only a G image, and the steps (b), (c), (d) and (g) may be performed in order to display B and R images.

The operations of the above Example 2 similarly as that of the above Example 1 does not require an accurate control for alignment or registration between the color pixels and the writing means, so that a good color image can be formed relatively easily.

Figure 7:
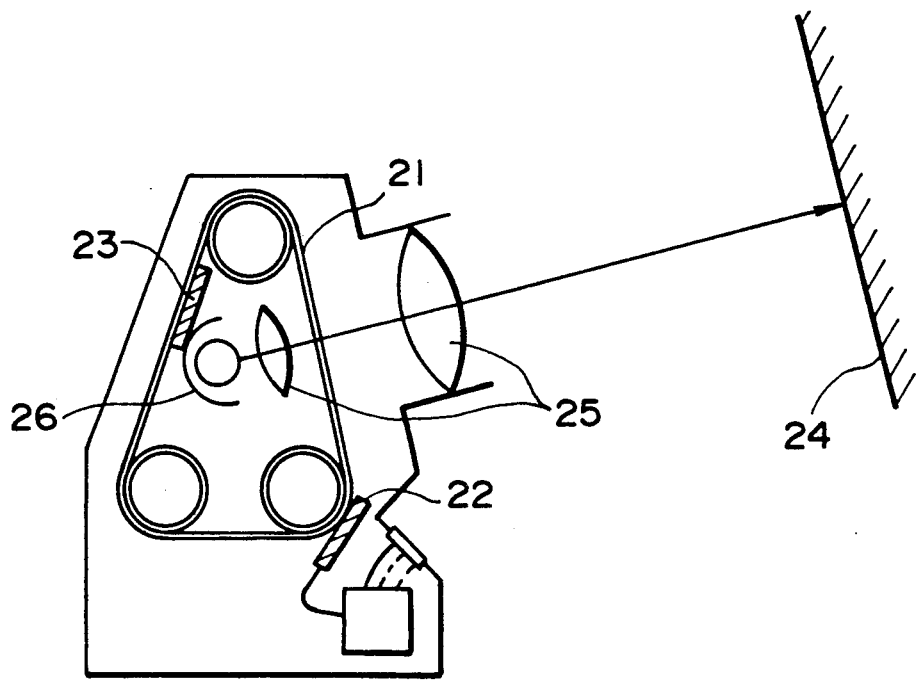
FIG. 7 illustrates an embodiment of a projection display apparatus incorporating a display medium according to the present invention.

FIG. 7 illustrates an embodiment of a projection display apparatus using a display medium 21 as described above in the form of an endless belt.

In this apparatus, a desired color image is formed on a display medium 21 by a thermal head 22 and is then projected onto a screen 24 by means of a projection optical system comprising a lens 25 and a light source 26. After that, the display medium 21 having the image is heated to and held at a liquid crystal temperature for a prescribed time by a planar heater 23 for erasure, so that the display medium is uniformly erased into the original optical scattering state and prepared for next image formation.

As described above, according to the present invention, a highly fine image can be displayed in a clarity comparable to that of a hard copy.

What is claimed is:

1. A display medium, comprising a colored polymer liquid crystal layer having at least two display regions of different colors along an extension of said colored polymer liquid crystal layer, said display regions of different colors having respectively different wavelength regions of light absorption and containing dyes showing respectively different light-absorbing sensitivities.

2. A medium according to claim 1, wherein said dyes showing respectively different light-absorbing sensitivities are laser-absorbing dyes further added into said display regions of different colors.

3. A medium according to claim 1, wherein said display regions of different colors are disposed in the form of mosaic or stripes in the polymer liquid crystal layer.

4. A medium according to claim 1, wherein said different colors are three colors of blue, green and red.

5. A medium according to claim 1, which is in the form of an endless belt.

6. A medium according to claim 1, wherein said colored polymer liquid crystal layer having at least two display regions of different colors also forms a transparent part and a scattering part therein.

7. A display apparatus, comprising:
a display medium having a colored polymer liquid crystal layer having at least two display regions of different colors along an extension of said polymer liquid crystal layer, said display regions of different colors having different temperatures of thermal transition between transparent and scattering states, and
heat-application means for changing said display regions of different colors from the transparent state to the scattering state or from the scattering state to the transparent state.

8. An apparatus according to claim 7, wherein said display regions of different colors comprise respectively different polymer liquid crystal materials.

9. An apparatus according to claim 7, wherein said display regions of different colors are disposed in the form of mosaic or stripes in the polymer liquid crystal layer.

10. An apparatus according to claim 7, wherein said different colors are three colors of blue, green and red.

11. An apparatus according to claim 7, wherein said display medium comprising a colored polymer liquid crystal layer is in the form of an endless belt.

12. A display apparatus, comprising:
a display medium having a colored polymer liquid crystal layer having at least two display regions of different colors along an extension of said polymer liquid crystal layer, said display regions of different colors having respectively different wavelength regions of light absorption and containing dyes showing respectively different light-absorbing sensitivities; and
a laser for writing in said colored polymer liquid crystal layer.

13. An apparatus according to claim 7, wherein said heat-application means is a contact-heating means.

14. An apparatus according to claim 12, wherein said display regions of different colors are disposed in a mosaic or striped patterns in the polymer liquid crystal layer.

15. An apparatus according to claim 12, wherein said different colors are blue, green and red.

16. An apparatus according to claim 12, wherein said display medium is an endless belt.

17. An apparatus according to claim 12, wherein said dyes showing respectively different light-absorbing sensitivities are laser-absorbing dyes further added into said display regions of different colors.

18. A display medium, comprising a colored polymer liquid crystal layer having at least two display regions of different colors along an extension of said colored polymer liquid crystal layer, with said display regions of different colors having different temperatures of thermal transition between transparent and scattering states, and said display regions of different colors comprising respectively different polymer liquid crystal materials.

19. A medium according to claim 18, wherein said display regions of different colors are disposed in mosaic or striped patterns in the polymer liquid crystal layer.

20. A medium according to claim 18, wherein said different colors are blue, green and red.

21. A medium according to claim 18, wherein said display medium is an endless belt.

22. A display apparatus, comprising:
a display medium comprising a colored polymer liquid crystal layer having at least two display regions of different colors along an extension of said colored polymer liquid crystal layer, said display regions of different colors having different temperatures of thermal transition between transparent and scattering states, and said display regions of different colors comprising respectively different polymer liquid crystal materials; and
heat-application means for changing said display regions of different colors from the transparent state to the scattering state or from the scattering state to the transparent state.

23. An apparatus according to claim 22, wherein said display regions of different colors are disposed in mosaic or striped patterns in the polymer liquid crystal layer.

24. An apparatus according to claim 22, wherein said different colors are three colors of blue, green and red.

25. An apparatus according to claim 22, wherein said display medium is an endless belt.

26. An apparatus according to claim 22, wherein said heat-application means is a contact-heating means.

* * * * *

UNITED STATES PATENT AND TRADEMARK OFFICE
CERTIFICATE OF CORRECTION

PATENT NO. : 5,140,447
DATED : August 18, 1992
INVENTOR(S) : Shuzo Kaneko, et al.

It is certified that error appears in the above-identified patent and that said Letters Patent is hereby corrected as shown below:

Title page, item
[56] REFERENCES CITED:

FOREIGN PATENT DOCUMENTS, insert:  --141512  5/1985  Europe--.

Signed and Sealed this

Fifteenth Day of March, 1994

Attest:

BRUCE LEHMAN

Attesting Officer

Commissioner of Patents and Trademarks